United States Patent
Gada et al.

(10) Patent No.: US 11,748,714 B1
(45) Date of Patent: Sep. 5, 2023

(54) EFFICIENT MEETING ROOM RESERVATION AND SCHEDULING

(71) Applicant: Amazon Technologies, Inc., Seattle, WA (US)

(72) Inventors: Devansh Gada, Seattle, WA (US); Brendon Xavier Faleiro, Seattle, WA (US); Thomas Rozanski, Seattle, WA (US); Divyang Mahendrabhai Upadhyay, Bellevue, WA (US); Hwee Hong Christopher Chew, Seattle, WA (US)

(*) Notice: Subject to any disclaimer, the term of this patent is extended or adjusted under 35 U.S.C. 154(b) by 0 days.

(21) Appl. No.: 16/836,109

(22) Filed: Mar. 31, 2020

(51) Int. Cl.
    *G06Q 10/10*     (2023.01)
    *G06Q 10/1093*     (2023.01)
    *G06Q 10/0631*     (2023.01)

(52) U.S. Cl.
    CPC ... *G06Q 10/1095* (2013.01); *G06Q 10/06311* (2013.01); *G06Q 10/06312* (2013.01); *G06Q 10/1097* (2013.01)

(58) Field of Classification Search
    CPC .................................................. G06Q 10/10
    See application file for complete search history.

(56) References Cited

U.S. PATENT DOCUMENTS

| | | | |
|---|---|---|---|
| 9,741,020 B2* | 8/2017 | Min | G06Q 10/06314 |
| 2014/0187213 A1* | 7/2014 | Shuster | H04W 64/00 455/414.1 |
| 2014/0188541 A1* | 7/2014 | Goldsmith | H04L 67/306 705/7.19 |
| 2016/0063449 A1* | 3/2016 | Duggan | G06Q 10/1095 705/7.19 |
| 2016/0140508 A1* | 5/2016 | Ossia | G06Q 10/1095 705/7.19 |
| 2020/0293999 A1* | 9/2020 | Bhattacharya | G06N 20/00 |
| 2020/0312120 A1* | 10/2020 | VanBlon | G08B 21/22 |
| 2021/0019709 A1* | 1/2021 | Ghatak | G06Q 10/0631 |

* cited by examiner

*Primary Examiner* — Kurtis Gills
(74) *Attorney, Agent, or Firm* — Lee & Hayes, P.C.

(57) ABSTRACT

Technology is described reserving meeting locations. A request to reserve a meeting location during a defined time period may be received via a device. The request may include location attribute criteria for the meeting location. Candidate meeting locations that satisfy the location attribute criteria specified in the request may be identified. The candidate meeting locations may be available to hold a meeting during the defined time period. A target meeting location may be selected from the candidate meeting locations based in part on rankings associated with the candidate meeting locations.

20 Claims, 11 Drawing Sheets

Room 1; Floor3; Capacity 6

| 8AM | 9AM | 10AM | 11AM |
|---|---|---|---|
|  | Room1; Event1 |  | Room1; Event2 |

Room 2; Floor3; Capacity 6

| 8AM | 9AM | 10AM | 11AM |
|---|---|---|---|
| Room2; Event1 | | | |

Room 3; Floor3; Capacity 7

| 8AM | 9AM | 10AM | 11AM |
|---|---|---|---|
| Room3; Event1 |  |  | Room3; Event2 |

Room 4; Floor3; Capacity 5

| 8AM | 9AM | 10AM | 11AM |
|---|---|---|---|
| Room4; Event1 |  | Room4; Event2 |  |

FIG. 3A

Room 1; Floor3; Capacity 6

Room 2; Floor3; Capacity 6

Room 3; Floor3; Capacity 7

Room 4; Floor3; Capacity 5

US 11,748,714 B1

EFFICIENT MEETING ROOM RESERVATION AND SCHEDULING

BACKGROUND

Meeting room scheduling applications in a computing environment may allow workers to efficiently reserve meeting rooms to hold meetings. For example, a worker may open a room scheduling application with a graphical user interface to schedule an available meeting room at a certain time. The worker may view meeting rooms that are available at a certain time, a size of a room, as well as amenities (e.g., video conferencing equipment, projector) that are available in the meeting rooms. The worker may, via the room scheduling application, reserve a meeting room having the appropriate amenities and an appropriate size for the certain time and select attendees to be included in the meeting. The room scheduling application may transmit a message to each of the attendees with details of the scheduled meeting (e.g., meeting time and room number).

Room scheduling applications may prevent room hoarding and wasted meetings. For example, room hoarding may occur when there is no procedure for reserving meeting rooms, so workers may arrive early to claim a meeting room for an upcoming meeting. Workers that come to the meeting room later for a meeting may find that the meeting room has already been occupied. Wasted meetings may occur when a particular meeting is canceled, so a meeting room that was to hold the meeting is now available but other workers are not aware that the meeting room is available. In this case, the meeting room may be unnecessarily blocked from other use even though there is no meeting taking place.

BRIEF DESCRIPTION OF THE DRAWINGS

FIG. 3A illustrates a meeting schedule for a plurality of meeting rooms according to an example of the present technology.

DETAILED DESCRIPTION

Figure 1:
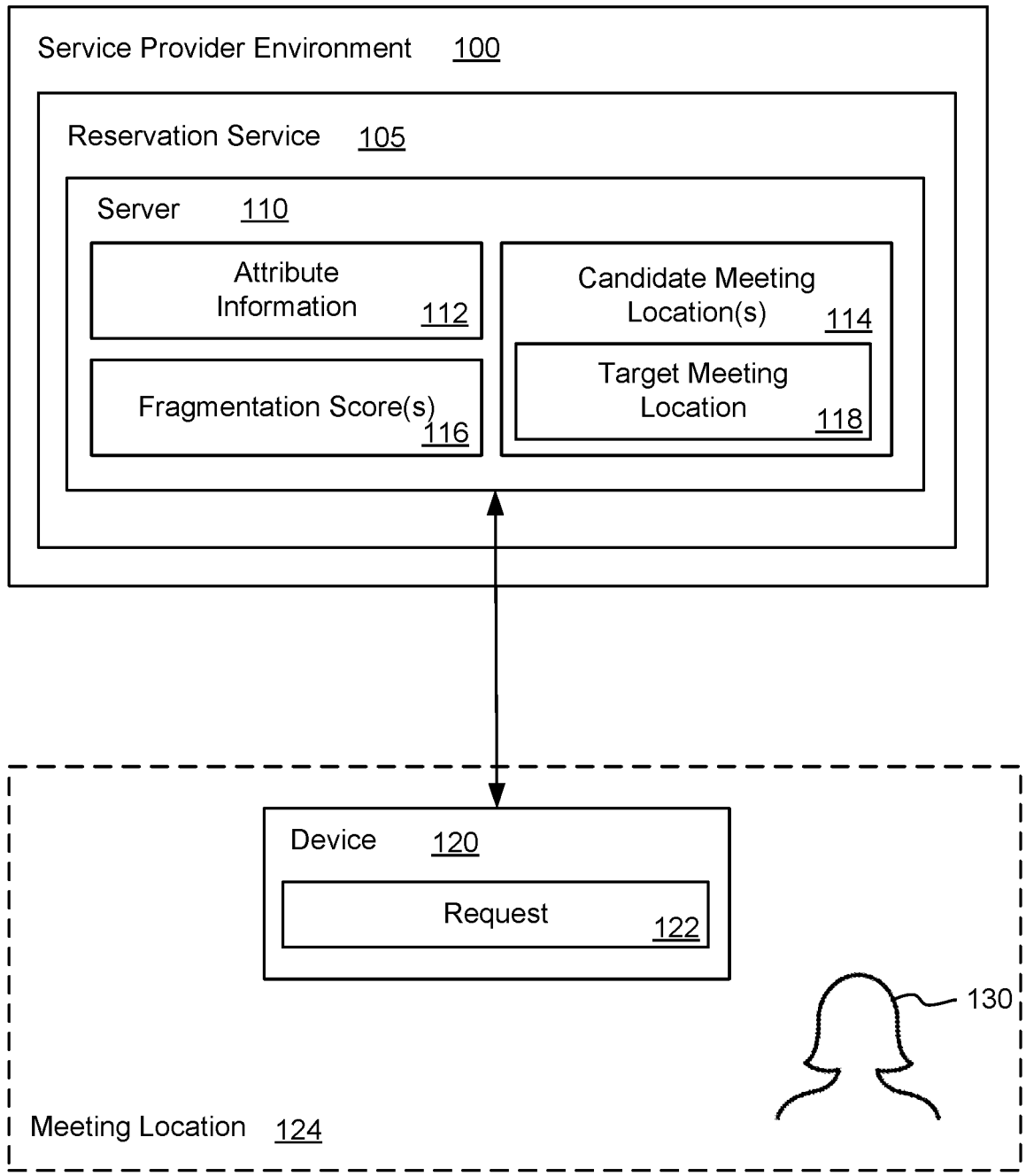
FIG. 1 is a block diagram illustrating a system for selecting a target meeting room to hold a meeting based on a request according to an example of the present technology.

Technologies are described for efficiently scheduling meeting rooms. In one example a request to reserve a selected meeting room for a defined time period is received, via a device associated with the selected meeting room. If the selected meeting room is determined to be unavailable for the defined time period, a target meeting room that has similar attributes (e.g., capacity, location, and amenities) to the selected meeting room can be identified. The target meeting room may be identified from candidate meeting rooms that each have similar attributes to the selected meeting room. Further, the target meeting room may be selected when a fragmentation score for the target meeting room that results from holding the meeting in the target meeting room is below a certain threshold or is less than fragmentation scores resulting from holding the meeting in other candidate meeting rooms. The fragmentation score may indicate a level of defragmented room utilization for individual meeting rooms, where an increased fragmentation score may indicate an increased level of fragmented room utilization and a decreased fragmentation score may indicate a decreased level of fragmented room utilization.

In one example, meeting locations may be efficiently scheduled using the technology described herein. For example, a device (e.g., a voice capturing device, touch-screen panel, etc.) associated with a selected meeting location may receive a request to reserve the selected meeting location for a specified time. The request may be sent to a reservation service operating in a cloud environment. The reservation service may determine that the meeting location is not available to hold the meeting at the specified time. The reservation service may then identify attributes (e.g., capacity, floor, amenities) of the selected meeting location. The reservation service may identify candidate meeting locations having attributes that correspond with those of the selected meeting location. The reservation service may determine a fragmentation score that would result for individual candidate meeting locations if the meeting were to be held in those candidate meeting locations. The reservation service may select a target meeting location from the candidate meeting locations based on the fragmentation score for the individual candidate meeting locations.

In another example, a device associated with a meeting location may capture a request to reserve the meeting location from a user in the meeting location. The request may be sent to a reservation service operating in a service provider environment. The reservation service may determine that the meeting location is not available to hold the meeting at a specified time. The reservation service may identify attributes (e.g., capacity, floor, amenities) of the meeting location. The reservation service may identify candidate meeting locations having attributes corresponding to the meeting location. The reservation service may select a target meeting location from the candidate meeting locations based on rankings associated with the candidate meeting locations.

In one example, a device associated with a meeting room may be in the meeting room. The device may be a voice capturing device, and the voice capturing device may be in the meeting room. In an alternative example, the device may be in a meeting location, which may be tied to a common space on a particular floor of a building such as a hallway, a lounge, common area meeting tables, or kitchen, a bench outside an elevator, an entryway of a building, a parking lot of a building, etc. In yet another example, the device may be a touch-screen panel outside a meeting room, or a kiosk associated with a group of meeting rooms. The request may be a verbal request, such as a voice request, from the user to reserve the meeting room at a defined time period (e.g., the next upcoming time slot). In such an instance, the device associated with the request may include room attribute criteria for the meeting room to be reserved, where the room attribute criteria may include a number of attendees that will attend the meeting, a minimum and maximum capacity for the meeting room, a building floor to be associated with the meeting room, amenities to be included in the meeting room, etc. The device in the meeting room may capture the request from the user via a microphone, keyboard, mouse or other user input devices included with the device and the device may reside on the conference room table. For example, the device may be a smart assistant device such as an office automation device, a mobile device or another device that is programmed with the location of the room and may receive commands, such as voice commands, commands entered via a graphical user interface or commands entered via another type of known computer interface. The device may transmit the request including the room attribute criteria to a room reservation service operating in a service provider environment.

As a non-limiting example, the user may walk into the meeting room and verbally say "Is this meeting room available tomorrow at 3 PM", "Book a meeting having a video projector for 4 attendees tomorrow at 9 AM.", or "Is this meeting room available now or this afternoon?"

In one example, the room reservation service may operate server(s) for identifying a target meeting room based on the received request. For example, the server may determine whether the meeting room including the device in which the request was received is available to hold the meeting at the defined time period. The server may check a calendar for the meeting room in which the request was received, and if the calendar indicates that the meeting room is available during the defined time period, the server may reserve the meeting room during the defined period while accounting for fragmentation of the reserved meeting room.

In one example, the server may determine based on the calendar that the meeting room in which the request was received is not available to hold the meeting during the defined time period. For example, the calendar may indicate that another meeting is already scheduled in the meeting room during the defined time period. In this case, the server may identify another meeting room (e.g., a target meeting room) to hold the meeting during the defined time period. In other words, when the meeting room in which the request was received is not available to hold the meeting during the defined time period, the server may initiate a process for identifying candidate meeting rooms and selecting the target meeting room from the candidate meeting rooms while accounting for fragmentation of the selected target meeting room.

In one example, in order to identify the target meeting room, the server may identify room attributes of the meeting room that includes the device that received the request. In other words, the room attributes of the meeting room in which the user provided the request may serve as a benchmark or base definition for a type of meeting room that the user desires to hold the meeting, unless otherwise specified in the room attribute criteria. The room attributes of the meeting room may include, but are not limited to, a capacity of the meeting room (e.g., a number of attendees that can be accommodated in the meeting room), a building floor associated with the meeting room and/or amenities included in the meeting room.

The server may identify candidate meeting rooms that have room attributes corresponding to the meeting room in which the request was received, where the candidate meeting rooms are available during the defined time period to potentially hold the meeting. For example, the server may assign a ranking to a plurality of meeting rooms. The ranking may be based on a similarity between room attributes of individual meeting rooms in the plurality of meeting rooms and the room attributes of the meeting room in which the request was received. The meeting rooms may be ranked from high to low, where higher ranked meeting rooms may include room amenities that are more similar to the room attributes of the meeting room in which the request was received, while lower ranked meeting rooms may include room amenities that are less similar to the room attributes of the meeting room in which the request was received. Individual meeting rooms that are assigned a ranking that is above a defined threshold may be identified as the candidate meeting rooms.

The server may determine a fragmentation score for each of the candidate meeting rooms if the meeting were to be scheduled in the candidate meeting rooms during the defined time period. The fragmentation score may indicate the level of defragmented room utilization for the candidate meeting rooms. For example, if scheduling the meeting in a given candidate meeting room would increase the defragmented room utilization for the candidate meeting room (e.g., scheduling the meeting would result in several back-to-back meetings, thereby improving room efficiency), then the fragmentation score for that candidate meeting room may be decreased. On the other hand, if scheduling the meeting in a given candidate meeting room would increase the room schedule fragmentation and decrease the room utilization for the candidate meeting room (e.g., scheduling the meeting would leave short time gaps in the meeting room's schedule and additional meetings would be unable to be scheduled in those short time gaps), then the fragmentation score for that candidate meeting room may be increased.

The server may select the target meeting room from the candidate meeting rooms based in part on the fragmentation score. For example, the selected target meeting room may have a fragmentation score that is less than fragmentation scores for other candidate meeting rooms if the meeting were to be scheduled in those other candidate meeting rooms. In addition, the server may send a notification to the user that made the request, where the notification may indicate the target meeting room that is selected to hold the meeting during the defined time period.

In an alternative example, the server may send an audio notification to the device that indicates the target meeting room for holding a meeting, and the device may play the audio notification to enable the user in the meeting room to be notified of the selected target meeting room to be used for the meeting (e.g., a meeting room other than the location where the user is querying from).

In one example, a plurality of meeting rooms may be filtered based on room attributes corresponding to the meeting room in which the request was received. The plurality of meeting rooms may be filtered to produce the candidate meeting rooms. After the candidate meeting rooms are identified, the candidate meeting rooms may be further filtered based on the fragmentation scores of the candidate meeting rooms. Therefore, based on the fragmentation scores, the target meeting room may be selected from the candidate meeting rooms.

FIG. 1 illustrates an example of a system and related operations for selecting a target meeting location 118 to hold a meeting based on a request 122. A device 120 associated with a meeting location 124 may receive the request 122 from a user 130 in the meeting location 124. In one example, the device 120 may be a voice capturing device and the request 122 may be a voice request received from the user 130. The device may be associated with the meeting location 124 by being placed, in the meeting location, near the meeting location, or otherwise being associated with the meeting location. The meeting location 124 may include, but is not limited to, a meeting room, a common space on a particular floor of a building such as a hallway, a lounge, common area meeting tables, kitchen, a bench outside an elevator, an atrium, an entryway of a building, or a parking lot of a building. For example, the user 130 may walk into the meeting location 124 and provide the request 122 to the device 120, where the request 122 may be related to reserving the meeting location 124 for an upcoming meeting. The request 122 may include various levels of detail relating to the upcoming meeting. In one example, the request 122 may simply include a defined time period for the upcoming meeting. In another example, the request 122 may include the defined time period, as well as other meeting room criteria, such as a capacity for the meeting room, a floor or location for the meeting room, amenities in the meeting room, etc.

The device 120 may receive the request 122 and forward the request 122 to a reservation service 105 that operates in a service provider environment 100. The reservation service 105 may include a server 110 that processes the request to select the target meeting location 118 for the user 130 based on the request 122 received via the device 120. For example, the server 110 may identify location attribute information 112 associated with the meeting location 124 where the device 120 is located. In other words, the server 110 may identify the location attribute information 112 associated with the meeting location 124 in which the request 122 was received from the user 130. The location attribute information 112 may serve as a benchmark or starting point in selecting the target meeting location 118 based on an assumption that the user 130 made the request 122 in the meeting location 124 because the meeting location 124 satisfies the capacity, location, amenities, etc. room criteria for the meeting. The location attribute information 112 may serve as the benchmark or starting point when selecting the target meeting location 118 unless the request 122 specifically includes meeting room criteria, such as capacity, location, amenities, etc., in which case the meeting room criteria included in the request 122 may be considered as the benchmark or starting point when selecting the target meeting location 118.

As a non-limiting example, if the user 130 submits the request 122 in a meeting location 124 having a capacity for six attendees, on a second floor and having video conferencing equipment, the server 110 may assume that such room attributes are desired by the user 130 when selecting the target meeting location 118.

The server 110 may identify candidate meeting locations 114 having room attributes corresponding to the location attribute information 112 associated with the meeting location 124 that includes the device 120 and/or the meeting room criteria specified in the request 122. For example, the server 110 may filter a plurality of meeting rooms based on availability during the defined time period specified in the request 122, and then filtering may occur based on having the corresponding room attributes, or vice versa. In one example, the server 110 may assign a ranking to meeting rooms that have availability during the defined time period to hold the meeting, and the meeting rooms which meet a certain ranking threshold may be considered to be the candidate meeting locations 114. For example, the ranking may be based on a similarity between room attributes of individual meeting rooms and the location attribute information 112 associated with the meeting location 124 that includes the device 120 and/or the meeting room criteria specified in the request 122. Meeting rooms that are more similar may have an increased ranking and therefore may be selected as being the candidate meeting locations 114, while meeting rooms that are less similar may have a decreased ranking and therefore may not be selected as being the candidate meeting locations 114. As a non-limiting example, the location attribute information 112 associated with the meeting location 124 that includes the device 120 may include a capacity for 8 attendees, a location on a first floor and amenities including video conferencing equipment. In this example, the server 110 may assign a ranking to three meeting rooms that have availability during the defined time period to hold the meeting. A first meeting room may have a capacity for 8 attendees, a location on a second floor and amenities including video conferencing equipment. A second meeting room may have a capacity for 6 attendees, a location on a first floor and amenities including video conferencing equipment. A third meeting room may have a capacity for 10 attendees, a location on a first floor and amenities including video conferencing equipment. In this example, while the second meeting room is located on the first floor and includes video conferencing equipment, corresponding to the location attribute information 112, the second meeting room does not satisfy capacity criteria so would be ranked third out of the three meeting rooms. Both the first meeting room and the third meeting room satisfy the capacity criteria as well as have video conferencing equipment. However, since the third meeting room is on the first floor, which is more similar to the location attribute information 112, whereas the first meeting room is on the second floor, the third meeting room may be ranked higher than the first meeting room. Therefore, in this example, the third meeting room may be ranked first out of the three meeting rooms, the first meeting room may be ranked second out of the three meeting rooms, and the second meeting room may be ranked third out of the three meeting rooms.

In one example, the server 110 may determine a fragmentation score 116 for each of the candidate meeting location 114. The fragmentation score 116 may indicate a level of fragmentation for a given candidate meeting location 114 if the meeting were to be scheduled in the candidate meeting location 114 during the defined time period. As an example, the fragmentation score 116 may be a score ranging from 0 to 100, where a 100 may indicate that a calendar for a given candidate meeting location 114 would be highly fragmented if the meeting were to be scheduled at that candidate meeting location 114 during the defined time period. On the other hand, a 0 may indicate that a calendar for a given candidate meeting location 114 would be minimally or not fragmented if the meeting were to be scheduled at that candidate meeting location 114 during the defined time period. A reduced fragmentation score 116 may be considered favorable as it would allow meeting rooms to be used more efficiently. Further, a reduced fragmentation score 116 may allow a given meeting room to be used continuously for a certain period of time (e.g., four hours), which may allow other meetings to be scheduled in that meeting room more easily. For example, if a given meeting room has four one-hour meetings scheduled back-to-back in the morning, that meeting room may be able to accommodate a four-hour meeting that is to be scheduled in the afternoon. In contrast, if the four one-hour meetings were spread out throughout the day (i.e., more fragmented), that meeting room would be unable to accommodate a four-hour meeting at any point during the day.

Alternatively, the fragmentation scale described as being from 0 to 100 may be inverted in its meaning where 0 represents the most fragmentation and 100 represents the least fragmentation and the present technology may still operate. Also, the scoring and ranging of the fragmentation score may vary. For example, a range may be from 1-1000 or 1-5000 or the fragmentation may use alphabetic or alpha-numeric rankings.

In one example, the server 110 may select the target meeting location 118 from the candidate meeting locations 114 based in part on the fragmentation score 116 for each of the candidate meeting locations 114. For example, a candidate meeting location 114 having the lowest fragmentation score 116 among other candidate meeting locations 114 may be selected as the target meeting location 118. In another example, when the fragmentation scores 116 between certain candidate meeting locations 114 are similar or have a difference that is below a certain threshold (e.g., the difference between fragmentation scores 116 for the top three meeting rooms is negligible), the server 110 may use a round-robin scheduling mechanism or a token-based scheduling mechanism when selecting the target meeting location 118 among these certain candidate meeting locations 114, which may ensure that these candidate meeting locations 114 are fairly selected to be the target meeting location 118. Further, the server 110 may send a notification to the user 130 that made the request 122, where the notification may indicate the target meeting location 118 that is selected to hold the meeting during the defined time period. The server 110 may send the notification (e.g., an electronic mail notification) through an electronic mail application that the user 130 may access through a computing device, and the user 130 may forward the notification to other attendees to be included in the meeting. The user 130 or meeting organizer may determine whether or not to accept the proposed meeting.

In one example, the location attribute information 112 may not be available for the meeting location 124 in which the request 122 was received from the user 130. For example, location attribute information 112 for certain meeting locations may be optional or currently unknown to the system, and may not be available for the meeting location 124 in which the request 122 was received. In this case, the server 110 may use meeting location criteria specified in the request 122 to identify the candidate meeting locations 114. Further, the server 110 may use the fragmentation scores 116 without the location attributes to select the target meeting location 118 from the candidate meeting locations 114.

In one example, the device 120 may not be located in a specific meeting location, but rather may be located at a specific area of a floor in a building (e.g., on a wall near conference rooms). For example, each floor in the building may include a separate device for reserving meeting locations. Alternatively, each floor in the building may include a separate device (e.g., a tablet with graphical user interface) or electronic kiosk for reserving meeting locations. For example, the device 120 may be located in a common area of a floor in a building. In this case, the server 110 may receive, via the device 120, a request 122 that includes meeting location criteria and the server 110 may select the target meeting location 118 using the meeting location criteria included in the request 122. In other words, in this example, the server 110 may not use location attribute information 112 associated with a location of the device 120 because the device 120 may not be in a meeting location.

Figure 2:
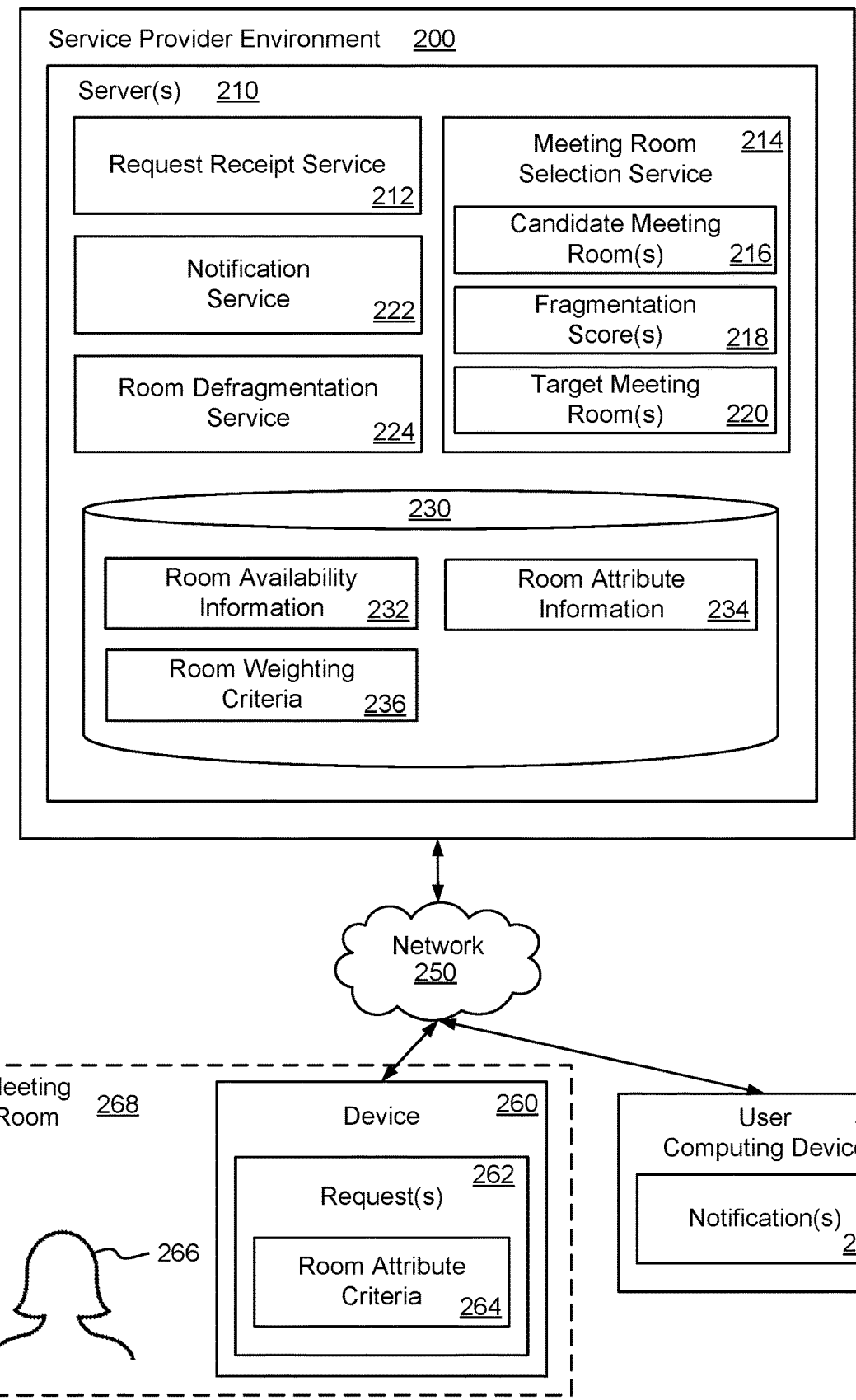
FIG. 2 is an illustration of a networked system for selecting a target meeting room to hold a meeting based on a request according to an example of the present technology.

FIG. 2 illustrates example components of the present technology in a service provider environment 200. The service provider environment 200 may include a server 210 operable to select a target meeting room 220 to hold a meeting based on a request 262. The server 210 may receive the request 262 from a device 260 over a network 250, where the device 260 may receive the request 262 from a user 266 in a meeting room 268, or the device 260 may receive the request 262 from the user 266 outside the meeting room 268. The server 210 may process the request 262 and select the target meeting room 220 that satisfies the request 262. The server 210 may send a notification 272 indicating the selected target meeting room 220 to a user computing device 270 associated with the user 266 that made the request 262. Alternatively, the server 210 may send a notification 272 (e.g., an audio notification) indicating the selected target meeting room 220 to the device 260, and the device 260 may play the notification 272 in the meeting room 268, thereby enabling the user 266 to be notified of the selected target meeting room 220.

In an alternative example, the server 210 may select a target meeting location, which may be the target meeting room 220, or a common space on a particular floor of a building such as a hallway or kitchen, a bench outside an elevator, an entryway of a building, an atrium, a parking lot of a building, etc.

In one example, the server 210 may include a data store 230 that includes room availability information 232. The room availability information 232 may include calendar information for a plurality of meeting rooms. For example, the room availability information 232 may include calendar information for meeting rooms in a specific building or meeting rooms in multiple buildings on a campus associated with a company, university, governmental organization, etc. The room availability information 232 may include, for a given meeting room, a list of meetings that are currently scheduled and corresponding meeting times. When a meeting is newly scheduled or moved to an alternate meeting room, the room availability information 232 may be updated to reflect the new meeting time and/or location.

In one example, the server 210 may include a data store 230 that includes room attribute information 234. The room attribute information 234 may describe various room features associated with the plurality of meeting rooms. For example, the room attribute information 234 may include, for a given meeting room, a room capacity (e.g., a capacity for 5 individuals or 12 individuals), a room location (e.g., a location on a first floor of building A or a second floor of building B), and room amenities (e.g., video conferencing equipment, projector system, coffee maker, copy machine, whiteboard, etc.)

In one example, the server 210 may include a data store 230 that includes room weighting criteria 236. The room weighting criteria 236 may be defined by the user 266 via the user computing device 270, or alternatively, the room weighting criteria 236 may be defined by an administrator. The room weighting criteria 236 may define certain room attributes which may be weighted higher or lower as compared to other room attributes, and the room weighting criteria 236 may be specific to the user 266. As an example, the room weighting criteria 236 may indicate that meeting rooms are to be selected with capacity and amenities having a highest weighting and location having a lower weighting for the user making a room query. In this example, based on the room weighting criteria 236, a first meeting room that satisfies the capacity and amenities criteria but is at a distant location may have priority over a second meeting room that does not satisfy the capacity and/or amenities criteria but is at a nearby location. The distant location and the nearby location may be determined by making a distance comparison relative to the meeting room 268 in which the request 262 was received from the user 266.

The server 210 may utilize a number of services for selecting the target meeting room 220 to hold the meeting based on the request 262. For example, the server 210 may operate a request receipt service 212, a meeting room selection service 214, a notification service 222, a room defragmentation service 224, and other applications, services, processes, systems, engines, or functionality not discussed in detail herein.

The request receipt service 212 may receive, via the device 260 in the meeting room 268, the request 262 to reserve the meeting room 268 during a defined time period. The request 262 may include room attribute criteria 264, which may indicate certain attributes that a reserved room should have for the meeting. The room attribute criteria 264 may be related to a capacity for the meeting room, a location for the meeting room, amenities to be included in the meeting room, etc.

The meeting room selection service 214 may select the target meeting room 220 in response to the request 262. For example, the meeting room selection service 214 may identify room attribute information 234 associated with the meeting room 268 that includes the device 260 and in which the request 262 was received from the user 266. The meeting room selection service 214 may identify candidate meeting rooms 216 that have room attributes corresponding to the meeting room 268 that includes the device 260. For example, the meeting room selection service 214 may rank meeting rooms based on similarities between room attributes, and meeting rooms that are ranked above a certain threshold may be considered to be the candidate meeting rooms 216. Further, the meeting room selection service 214 may identify the candidate meeting rooms 216 based on meeting rooms that are available during the defined time period indicated in the request 262, as well as using the room weighting criteria 236 specified by the user 266 or administrator. The meeting room selection service 214 may determine fragmentation scores 218 for each of the candidate meeting rooms 216, and the meeting room selection service 214 may select the target meeting room 220 based in part on the fragmentation scores 218.

In one example, when selecting the target meeting room 220, the meeting room selection service 214 may predict certain meetings that are expected to be scheduled at certain times and at meeting rooms having certain room attributes based on historical information. For example, the meeting room selection service 214 may know that certain meetings are generally held weekly or monthly. The meeting room selection service 214 may determine the fragmentation scores 218 based on anticipated meetings that may occur, and use the fragmentation scores 218 to select the target meeting room 220.

The notification module 222 may transmit the notification 272 to the user computing device 270 associated with the user 266 after the target meeting room 220 has been selected to hold the meeting. The notification 272 may indicate the selected target meeting room 220 and the defined time period for the meeting. The user 266, after receiving the notification 272, may forward the notification 272 to other meeting attendees to inform them about the selected target meeting room 220 to hold the meeting In one example, after the notification 272 is sent to the user computing device 270, the server 210 may receive user feedback from the user computing device 270 regarding the selected target meeting room 220. For example, the user feedback may include a negative user response and/or a reason why the selected target meeting room 220 is not suitable for the meeting. In this case, the server 210 may change the target meeting room 220 to a new meeting room based on the user feedback. The server 210 may continue to consider the fragmentation scores 218 and other factors when selecting the new or updated meeting room to hold the meeting. Accordingly, the user or meeting organizer may accept or reject the meeting room selected prior to the meeting room actually being scheduled.

The room defragmentation service 224 may periodically (e.g., once per day, once every 4 hours or once a week) operate a defragmentation process for reviewing the room availability information 232 and for moving scheduled meetings in reserved meeting rooms to alternative times and locations to maximize continuous room utilization. In other words, the room defragmentation service 224 may move scheduled meetings to decrease fragmentation scores 218 for the meeting rooms. For example, by moving meetings to alternative times and/or locations such that multiple meetings may be scheduled back-to-back in a given meeting room, that meeting room may then be available for a larger period of time (e.g., 4 hours) to potentially hold a long meeting. In some cases, meetings may be scheduled based on the requests 262, but in other cases, meetings may be scheduled using other mechanisms (e.g., opening a calendar application and selecting a meeting room for a defined time period). Since meetings may be scheduled using multiple mechanisms, there may be inefficiency when looking at the meeting rooms as a whole because fragmentation may make scheduling longer meetings more difficult. Therefore, the room defragmentation service 224 may run the defragmentation process to rearrange meetings to maximize room utilization and allow for longer meetings to be scheduled.

In one example, the room defragmentation service 224 may operate the defragmentation process in real-time or while meetings are being scheduled. For example, the room defragmentation service 224 may operate in conjunction with the meeting room selection service 214 to maximize continuous room utilization. In this example, the room defragmentation service 224 may not run periodically, but rather may operate on an on-going basis while rooms are being schedule to ensure that target meeting rooms 220 that are selected by the meeting room selection service 214 have a maximum amount of room utilization to allow longer meetings to be scheduled in the target meeting rooms 220.

In one example, multiple meetings that are scheduled continuously or back-to-back may still have a time buffer in case one of the meetings become extended. For example, contiguously scheduled meetings may have a gap of 10-15 minutes to allow attendees from a first meeting to exit the meeting room and attendees for a second meeting to setup in the meeting room.

In one example, the room defragmentation service 224 may identify, based on the room availability information 232, that a first target meeting room is reserved to hold a meeting during a defined time period. The room defragmentation service 224 may identify a second target meeting room having similar room attributes (e.g., capacity, amenities) to the first target meeting room. The room defragmentation service 224 may determine that moving the scheduled meeting from the first target meeting room to the second target meeting room may change (e.g., increase or decrease) respective fragmentation scores 218 for the respective target meeting rooms. For example, moving the scheduled meeting from the first target meeting room to the second target meeting room may result in an increase in room usage or non-usage for the first target meeting room and/or the second target meeting room, thereby resulting in a decreased fragmentation score 218. Decreased fragmentation scores 218 may correspond to a reduced level of fragmentation. In this case, the notification module 222 may send to the user computing device 270 a notification including a recommendation or proposal to move the meeting to the second target meeting room, and the meeting may be moved or not moved based on a user response. Alternatively, the room defragmentation service 224 may automatically move the scheduled meeting to the second target meeting room, and the notification module 222 may send a notification to the user computing device 270 that indicates that the meeting has been moved to the second target meeting room. However, the user 266 may be provided with an option to reject the move to the second target meeting room.

In one example, the room defragmentation service 224 may identify additional meetings that have been scheduled in the target meeting room 220, wherein the additional meetings were not scheduled using requests 262. For example, the additional meetings may have been scheduled using a meeting scheduling application or via a browser. The room defragmentation service 224 may determine that the target meeting room 220 has an increased fragmentation score 218 due to the additional meetings being scheduled in the target meeting room 220. The room defragmentation service 224 may determine that moving a meeting scheduled in the target meeting room 220 to a second target meeting room having similar room attributes would improve the fragmentation score 218 of the target meeting room 220. In addition, the room defragmentation service 224 may send a recommendation to move the meeting to the second target meeting room.

In the above configuration, the meeting room selection service 214 may receive the request 262 and select the target meeting room 220 immediately after receiving the request 262. For example, a span of time between when the request 262 is received and when the target meeting room 220 is selected may simply be an amount of time to process the request 262 and select the appropriate target meeting room 220.

In an alternative configuration, the server 210 may receive a plurality of requests 262 from multiple users and wait until a certain time point has been reached (e.g., 7 PM), at which point the plurality of requests 262 may be collectively processed and a plurality of separate target meeting rooms 220 may be reserved simultaneously based on the requests 262. For example, the plurality of requests may be placed into a queue and may be later processed when the certain time point has been reached. In this alternative configuration, the plurality of requests 262 may be processed collectively in order to reduce room fragmentation. In other words, if the server 210 is processing multiple requests 262 at a same time, the server 210 may have a whole view of the defined time periods being requested in the multiple requests 262, and therefore may be more likely to schedule the meetings in meeting rooms in a schedule that reduces room fragmentation (i.e., improves room efficiency and contiguous or near-contiguous room utilization).

For example, in the alternative configuration, the request receipt service 212 may receive a plurality of requests 262 to reserve meeting rooms for the next day (e.g., Tuesday). Rather than processing the requests 262 immediately, the meeting room selection service 214 may wait to process the requests 262 until a defined time point prior to the next day (e.g., 10 PM on the Monday before the Tuesday). The notification module 222 may send a notification 272 indicating that the request 262 has been received and a meeting room is in the process of being selected. After the defined time point is reached, the meeting room selection service 214 may collectively process the requests 262. For example, the meeting room selection service 214 may identify candidate meeting rooms 216 based on the requests 262 received. The meeting room selection service 214 may determine, for individual candidate meeting rooms 216, fragmentation scores 218 that would result from holding meetings in response to the requests 262. The meeting room selection service 214 may select target meeting rooms 220 for the requests 262 based in part on the fragmentation scores 218 for the individual candidate meeting rooms. Further, the notification module 222 may send notifications 272 to the users that made the requests 262 about the target meeting rooms 220 selected for the meetings. A notification 272 to a user may be a recommendation or proposal concerning the selected target meeting room 220, and the user may accept the recommendation or decline the recommendation. In the alternative configuration, by collectively processing the requests 262, a plurality of meetings may be scheduled with a reduced risk of later moving selected target meeting rooms 220 to reduce fragmentation.

As a non-limiting example, when the requests 262 are processed one at a time, the meeting room selection service 214 may reserve a first meeting room to hold a meeting between 1-2 PM based on a first request received. At a later point in time, the meeting room selection service 214 may reserve a second meeting room to hold a meeting between 4-5 PM based on a second request received. At a later point in time, the meeting room selection service 214 may reserve a third meeting room to hold a meeting between 2-4 PM based on a third request received. In this example, the first meeting room, the second meeting room and the third meeting room may have similar attributes, so the room defragmentation service 224 may move the second meeting and the third meeting to the first meeting room. However, if the three requests were to be processed collectively, the three meetings may be automatically scheduled to be in the first meeting room and would not have to be moved at a later point in time.

The device 260 may be a voice capturing device. The voice capturing device may be a computing hardware device that includes a microphone and speaker(s). The device 260 may include voice command functionality, such that the device 260 may receive voice commands from the user 266 via the microphone and transmit the voice commands to the service provider environment 200. The service provider environment 200 may process the voice command and generate an output. The service provider environment 200 may send the output to the device 260, where the output may be provided to the user 266 via the speaker(s). The device 260 may be placed at various locations indoors and/or outdoors, and/or may be made mobile by placing the device 260 on a vehicle and/or a person.

The user computing device 270 may comprise, for example, a processor-based system. The user computing device 270 may be devices such as, but not limited to, desktop computers, laptops or notebook computers, tablet computers, mobile devices, mainframe computer systems, handheld computers, workstations, network computers, or other devices with like capability.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 250 may include any useful computing network, including an intranet, the Internet, a localized network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An application programming interface (API) may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

FIG. 3A illustrates an example of a meeting schedule for a plurality of meeting rooms. A server (e.g., the server 110 or the server 210) may identify the meeting schedule for the plurality of meeting rooms by accessing room availability information or room calendar information stored in a data store. In this example, a first meeting room may be on a third floor and have a capacity of six, a second meeting room may be on the third floor and have a capacity of six, a third meeting room may be on the third floor and have a capacity of seven, and a fourth meeting room may be on the third floor and have a capacity of five. In this example, the meeting rooms may have similar attributes, for example, in terms of capacity, floor and amenities. Further, in this example, the first meeting room may be reserved to have a first event from 9-10 AM and a second event from 11-12 PM, the second meeting room may be reserved to have an event from 8-10 AM, the third meeting room may be reserved to have a first event from 8-9 AM and a second event from 11-12 PM, and the fourth meeting room may be reserved to have a first event from 8-9 AM and a second event from 10-11 AM.

Figure 3B:
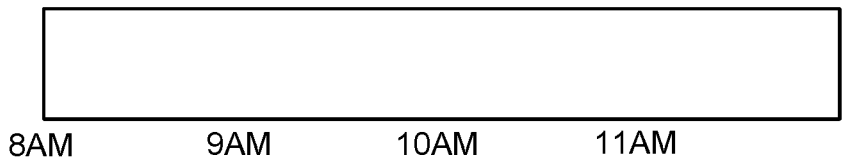
FIG. 3B illustrates a defragmented meeting schedule for a plurality of meeting rooms according to an example of the present technology.
Figure 3B:
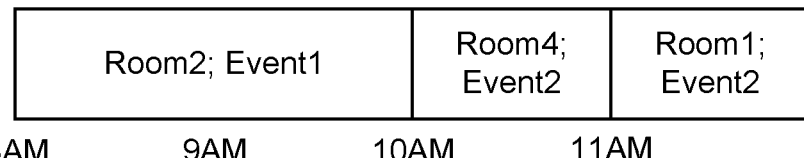
Figure 3B:
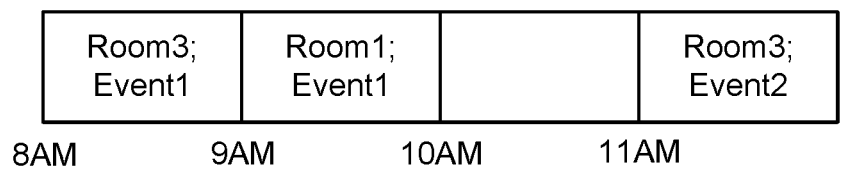
Figure 3B:
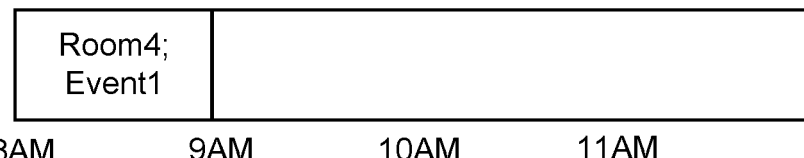

FIG. 3B illustrates an example of a defragmented meeting schedule for the plurality of meeting rooms in FIG. 3A. A server may run a defragmentation process on the meeting schedule (as shown in FIG. 3A) to arrive at the defragmented meeting schedule. The server may run the defragmentation process in order to increase the number of meetings in certain meeting rooms, thereby creating longer periods of room availability. In this example, the server may move the first event originally scheduled in the first meeting room to the third meeting room. When moving meetings between meeting rooms, the server may maintain the original time of the meeting. In other words, the defragmentation process may move the location for a meeting but does not modify a previously set time for the meeting because attendees may have already scheduled the meeting on their calendar and have possibly planned other events or meetings around this previously set time. For example, the first event was originally scheduled to be between 9-10 AM in the first meeting room, and even if the server determines to move that event to the third meeting room, the meeting time of 9-10 AM may remain the same. Further, the server may move the second event originally scheduled in the first meeting room to the second meeting room, and the server may move the second event originally scheduled in the fourth meeting room to the second meeting room. As a result, the four meeting rooms may have increased periods of room utilization or non-utilization, thereby increasing efficiency and enabling longer meetings to be scheduled. For example, based on the defragmentation process run by the server, the first meeting room may be available between 8-12 PM and could accommodate a 4-hour meeting, while the fourth meeting room may be available between 9-12 PM and could accommodate a 3-hour meeting. Prior to the defragmentation process, a maximum meeting time of two hours was possible in the third meeting room, but reserving a meeting room for three or four hours in a row was not possible.

Figure 4:
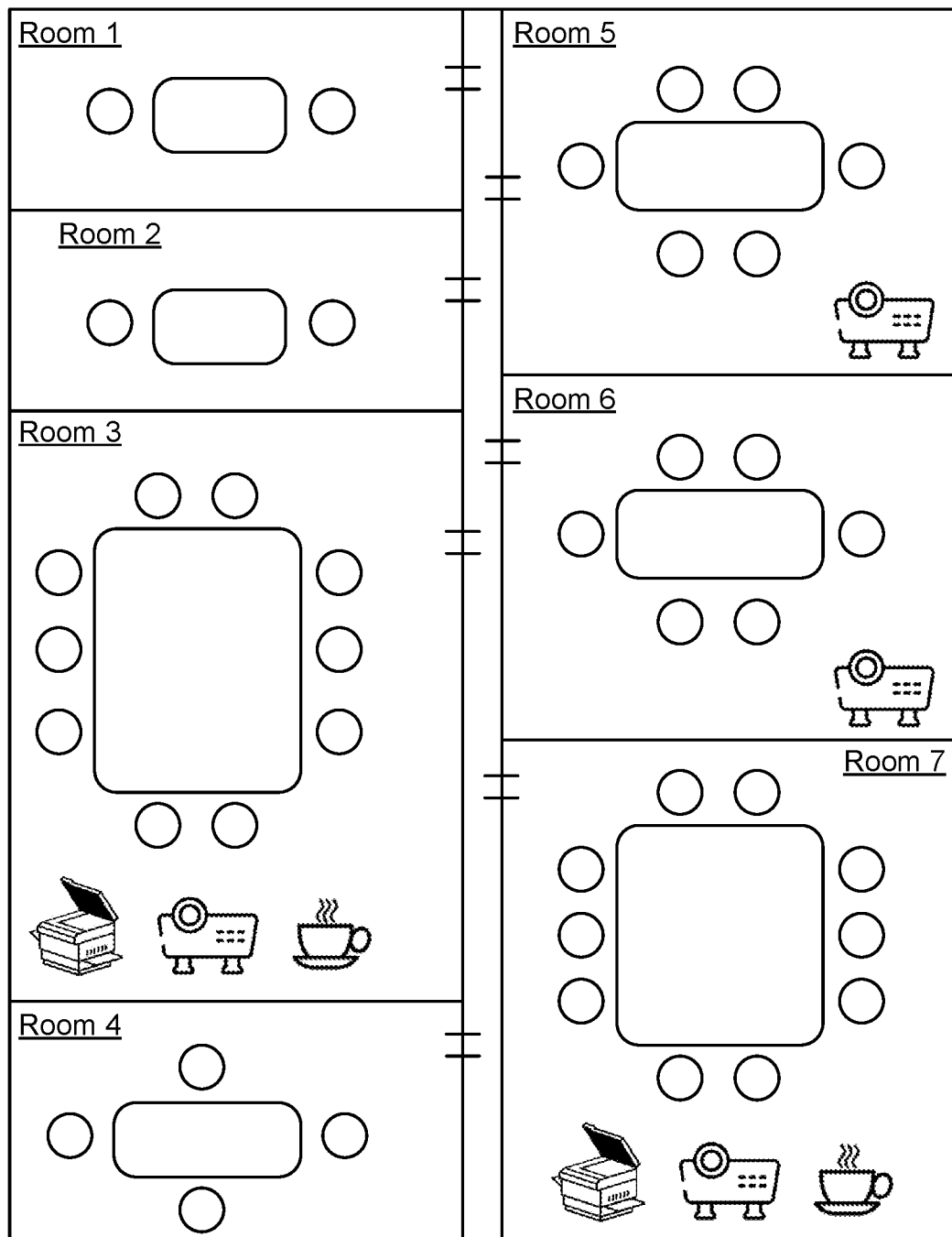
FIG. 4 illustrates room attribute information for a plurality of meeting rooms according to an example of the present technology.

FIG. 4 illustrates an example of room attribute information for a plurality of meeting rooms. For a given meeting room, a capacity of the meeting room, a floor or location associated with the meeting room, and amenities provided in the meeting room may be maintained. In this non-limiting example, the room attribute information may include a first meeting room, where the first meeting room may have a capacity for two attendees, is on a first floor and has no room amenities. The room attribute information may include a second meeting room, where the second meeting room may have a capacity for two attendees, is on a first floor and has no room amenities. The room attribute information may include a third meeting room, where the third meeting room may have a capacity for ten attendees, is on a first floor and has room amenities including a copy machine, a projector and a coffee maker. The room attribute information may include a fourth meeting room, where the fourth meeting room may have a capacity for four attendees, is on a first floor and has no room amenities. The room attribute information may include a fifth meeting room, where the fifth meeting room may have a capacity for six attendees, is on a first floor and has room amenities including a projector. The room attribute information may include a sixth meeting room, where the sixth meeting room may have a capacity for six attendees, is on a first floor and has room amenities including a projector. The room attribute information may include a seventh meeting room, where the seventh meeting room may have a capacity for twelve attendees, is on a first floor and has room amenities including a copy machine, a projector and a coffee maker. In this non-limiting example, the room attribute information may maintain the various room attributes for the plurality of meeting rooms, and the room attribute information may be used when selecting a meeting room to hold a meeting.

Figure 5:
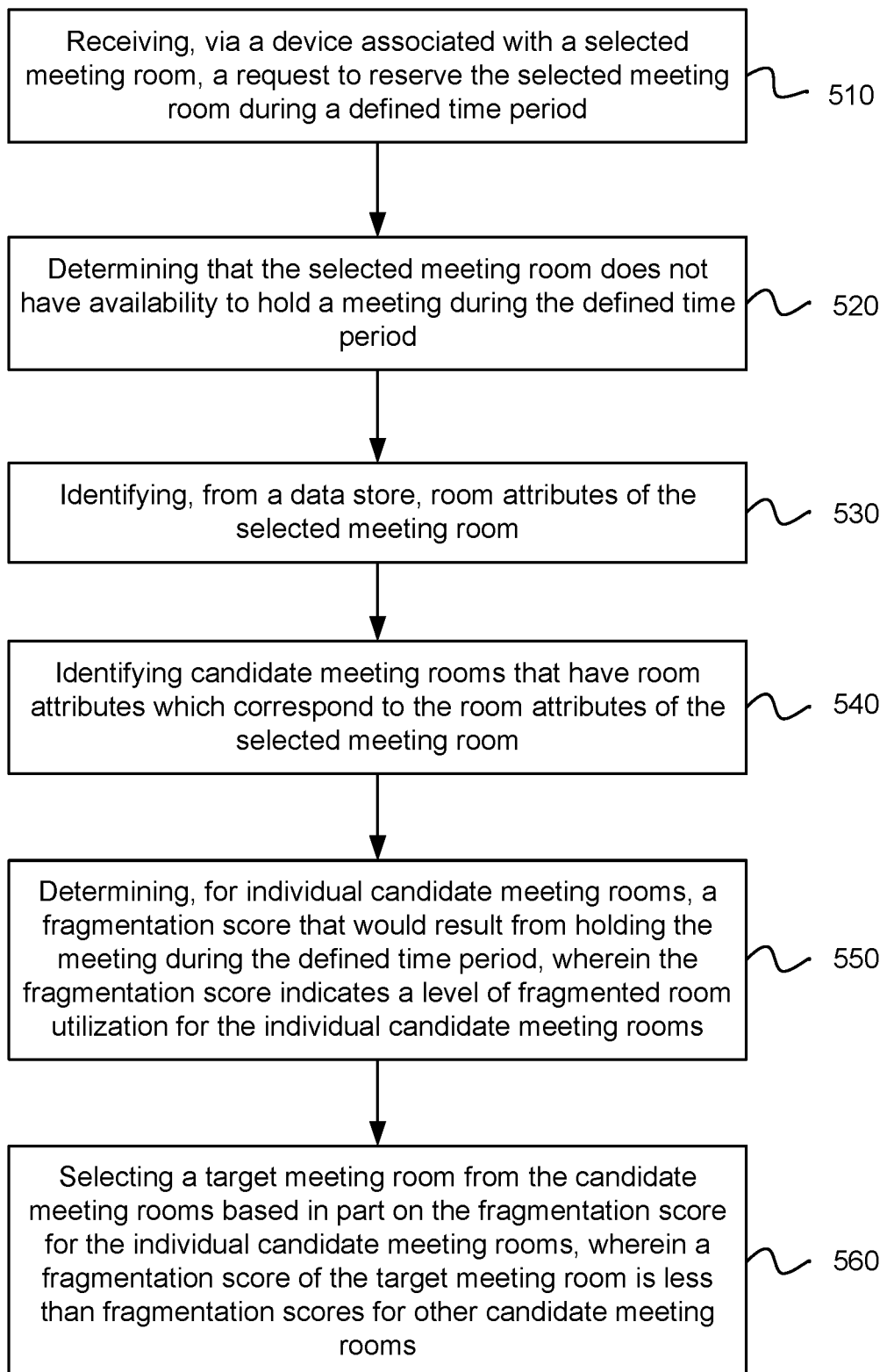
FIG. 5 is a flowchart of an example method for selecting a target meeting room from candidate meeting rooms based in part on fragmentation scores for individual candidate meeting rooms.

FIG. 5 illustrates an example of a method for selecting a target meeting room from candidate meeting rooms based in part on fragmentation scores for individual candidate meeting rooms. A request may be received, via a device associated with a selected meeting room, to reserve the selected meeting room during a defined time period, as in block 510. The device, such as a voice capturing device, may be in the selected meeting room, or the device may be outside the selected meeting room. For example, a user may walk into a meeting room and verbally request to reserve the meeting room for a meeting now or at a later time. The device may capture, via a microphone, the verbal request received from the user, generate the request to send to service in a network based on the verbal request, and transmit the request to a room reservation service operating in a service provider environment.

The selected meeting room may be determined to not have availability to hold the meeting during the defined time period, as in block 520. For example, the room reservation service may determine, from room calendar information with scheduling information for a plurality of meeting rooms, that the selected meeting room is not available to hold the meeting.

Room attributes of the selected meeting room that include the device may be identified, as in block 530. For example, the room reservation service may access a data store to identify the room attributes of the selected meeting room, which may include where the device resides or is located. The room attributes may include, but are not limited to, a capacity of the selected meeting room, a building floor associated with the selected meeting room and/or amenities included in the selected meeting room.

Candidate meeting rooms with room attributes corresponding to the meeting room that hosts the device may be identified, as in block 540. For example, candidate meeting rooms may be identified based on a ranking assigned to a plurality of meeting rooms, where the ranking may be based on a similarity between room attributes of individual meeting rooms in the plurality of meeting rooms as compared to room attributes of the meeting room hosting the device. Individual meeting rooms that are assigned a ranking that is above a defined threshold may be identified as the candidate meeting rooms.

A fragmentation score that would result from holding the meeting during the defined time period may be determined for individual candidate meeting rooms, as in block 550. Room fragmentation scores may indicate a level of fragmentation or separation between meetings scheduled in a given room (e.g., a number of smaller and less usable open slots in a room). In one example, candidate meeting rooms that have increased room utilization (e.g., more meetings with less unusable slots) may receive a decreased fragmentation score, and may be considered to be more favorable. On the other hand, candidate meeting rooms that have decreased overall room utilization may receive an increased fragmentation score, and may be considered to be less favorable. The fragmentation score may range from 0 to 100, where a fragmentation score of 100 may indicate a high amount of fragmentation whereas a fragmentation score of 0 may indicate minimal or no fragmentation.

A target meeting room may be selected from the candidate meeting rooms based in part on the fragmentation score, as in block 560. The selected meeting room may have room attributes that correspond to the room attributes of the meeting room that includes the device. In addition, holding the meeting in the selected target meeting room may result in a decreased fragmentation score for the target meeting room as compared to if the meeting was held in other candidate meeting rooms.

Figure 6:
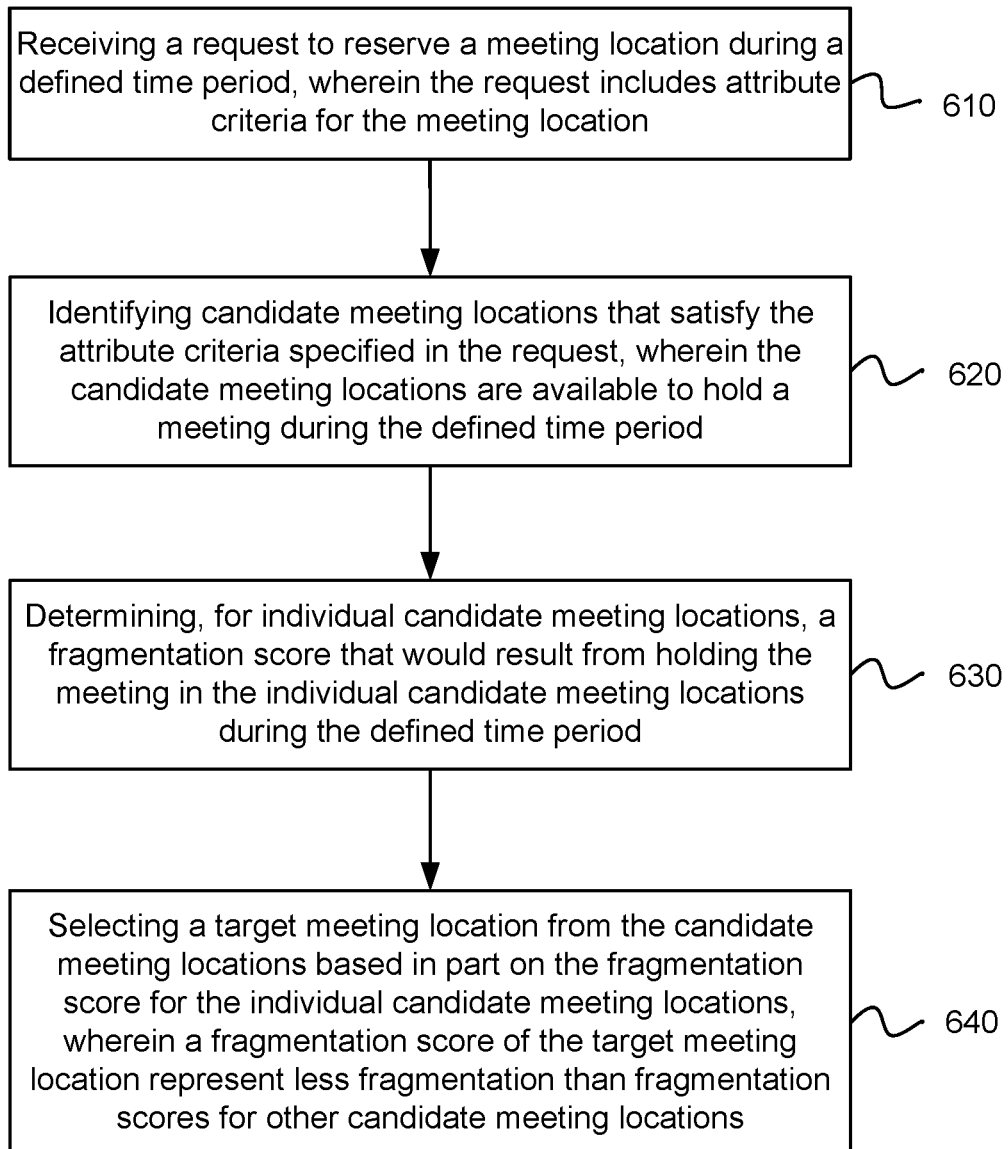
FIG. 6 is a flowchart of another example method for selecting a target meeting room from candidate meeting rooms based in part on fragmentation scores for individual candidate meeting rooms.

FIG. 6 illustrates an example of a method for selecting a target meeting location from candidate meeting locations based in part on fragmentation scores for individual candidate meeting locations. A request to reserve a meeting location during a defined time period may be received, as in block 610. The meeting location may be a meeting room, a common space on a particular floor of a building such as a hallway or kitchen, a bench outside an elevator, an entryway of a building, an atrium, a laboratory, a parking lot of a building, etc. The request may be a request received via a device, the request may be received via an application executing on a computing device, or the request may be received via a touch panel that is located in the meeting location or outside the meeting location. The request may include attribute criteria for the meeting location. For example, the attribute criteria may specify a capacity for the meeting location, a building floor to be associated with the meeting location and/or amenities to be included in the meeting location.

Candidate meeting locations that satisfy the attribute criteria specified in the request may be identified, as in block 620. For example, the candidate meeting locations may correspond to the location attribute criteria or the location attributes specified in the location attribute criteria. The candidate meeting locations may be available to hold a meeting during the defined time period. In one example, the candidate meeting locations may be identified based on weightings assigned to attributes associated with a plurality of meeting locations and these weightings may be applied on a per user or per customer account basis. Certain location attributes may be assigned increased weightings or decreased weightings as predetermined by a user or administrator, where the location attributes may include a capacity of the meeting location, a building floor associated with the meeting location and/or amenities included in the meeting location.

A fragmentation score that would result from holding the meeting in individual candidate meeting locations during the defined time period may be determined for the individual candidate meeting locations, as in block 630. The fragmentation score may indicate a level of fragmented room utilization for the individual candidate meeting locations.

A target meeting location may be selected from the candidate meeting locations based in part on the fragmentation score for the individual candidate meeting locations, as in block 640. Further, the selected target meeting location may satisfy the attribute criteria included in the request. In some cases, in addition to the fragmentation score and the attribute criteria, the target meeting location may be selected using a round-robin scheduling mechanism or a token-based scheduling mechanism.

Figure 7:
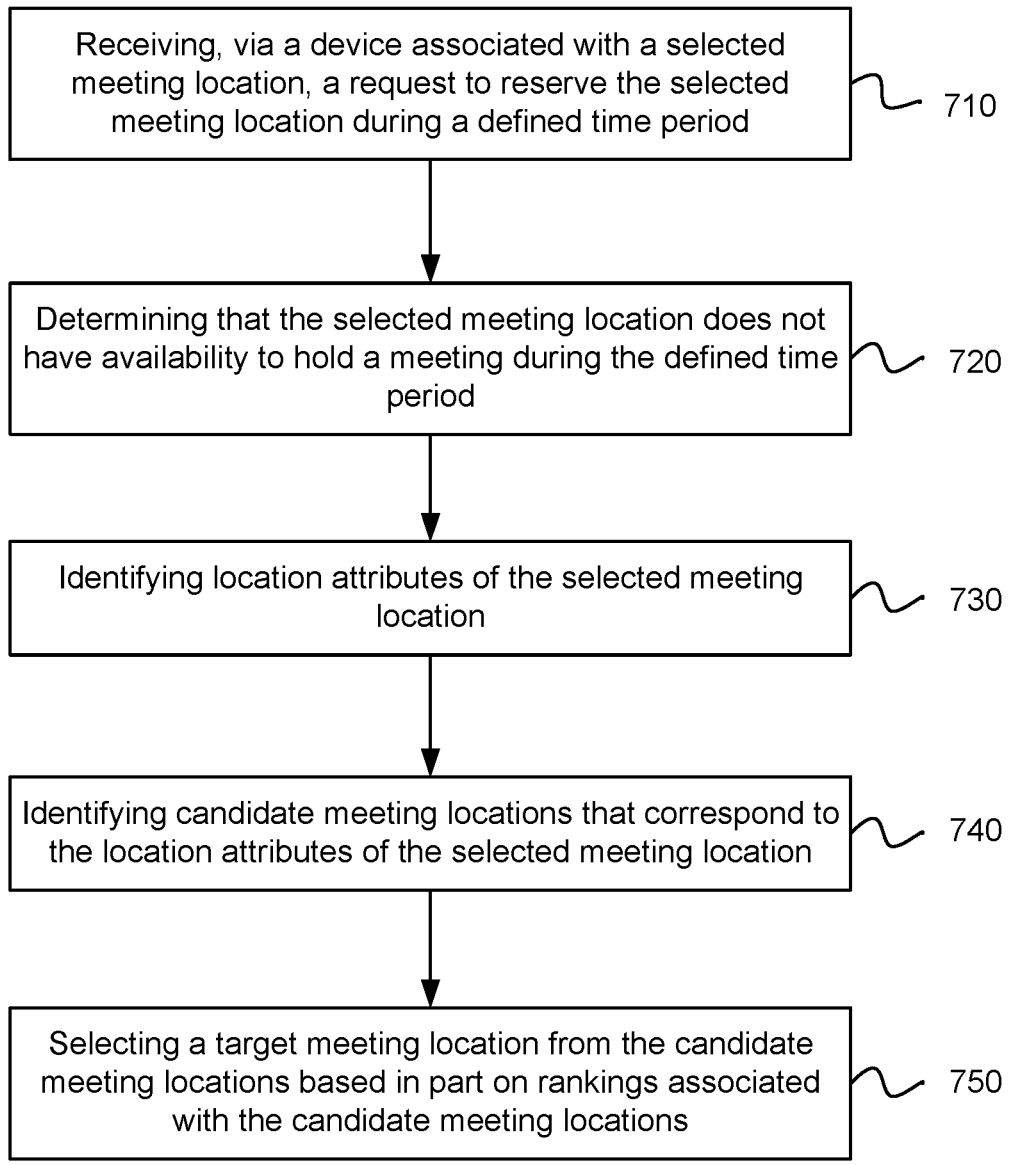
FIG. 7 is a flowchart of an example method for selecting a target meeting location.

FIG. 7 illustrates an example of a method for selecting a target meeting location. A request may be received, via a device associated with a selected meeting location, to reserve the selected meeting location during a defined time period, as in block 710. The selected meeting location may be a meeting room, a common space on a particular floor of a building such as a hallway or kitchen, a bench outside an elevator, an entryway of a building, an atrium, a laboratory, a parking lot of a building, etc. In one example, the request may be received via the device, and the device may be in the selected meeting location.

For example, a user may walk into a meeting location and verbally request to reserve the meeting room for a meeting now or at a later time. The device may capture, via a microphone, the verbal request received from the user, generate the request to send to service in a network based on the verbal request, and transmit the request to a reservation service operating in a service provider environment.

The selected meeting location may be determined to not have availability to hold the meeting during the defined time period, as in block 720. For example, the reservation service may determine, from calendar information with scheduling information for a plurality of meeting locations, that the selected meeting location is not available to hold the meeting.

Location attributes of the selected meeting location that include the device may be identified, as in block 730. For example, the reservation service may access a data store to identify the location attributes of the selected meeting location where the device resides or is located. In other words, the data store may include an indication that the device resides at a certain meeting location, and the data store may further include location attributes that are associated with that certain meeting location. The location attributes may include, but are not limited to, a capacity of the selected meeting location, a building floor associated with the selected meeting location and/or amenities included in the selected meeting location.

Candidate meeting locations with location attributes corresponding to the selected meeting location that hosts the device may be identified, as in block 740. For example, a plurality of meeting locations may be ranked based on a similarity between location attributes of individual meeting locations and the location attributes of the meeting location where the device is located. Individual meeting locations that are assigned a ranking above a defined threshold may be identified as the candidate meeting locations.

A target meeting room may be selected from the candidate meeting rooms based in part on rankings associated with the candidate meeting locations, as in block 750. For example, a ranking associated with the selected target meeting location may be higher than rankings of other candidate meeting locations.

In one example, each candidate meeting location may be associated with a ranking score, where the ranking score may indicate a level of similarity between location attributes of a given candidate meeting location and location attributes of the meeting location that include the device. As an example, the ranking score may range from 0 to 100, where a ranking score of 100 may indicate greater similarity between location attributes of a given candidate meeting location and location attributes of the meeting location that include the device, whereas a ranking score of 0 may indicate less similarity between location attributes of a given candidate meeting location and location attributes of the meeting location that include the device. Alternatively, the ranking scale described as being from 0 to 100 may be inverted in its meaning where 0 represents more similarity and 100 represents more similarity and the present technology may still operate.

In one example, a similarity between a candidate meeting location and a meeting location that includes the device may depend on a distance or a travel distance between the candidate meeting location and the meeting location that includes the device. For example, a candidate meeting location that is located physically closer to the meeting location that includes the device may result in that candidate meeting location being more similar as compared to other candidate meeting locations that are located physically farther from the meeting location that includes the device. In addition, the similarity may depend on a number of shared amenities between a candidate meeting location and the meeting location that includes the device, an overlap in a number of persons that can occupy a candidate meeting location versus a number of persons that can occupy the meeting location that includes the device, etc.

In one example, the candidate meeting locations may be identified based on prioritizations assigned to location attributes associated with a plurality of meeting locations and these prioritizations may be applied on a per user or per customer account basis. Certain location attributes may be assigned increased priority or decreased priority as predetermined by a user or administrator, where the location attributes may include a capacity of the meeting location, a building floor associated with the meeting location and/or amenities included in the meeting location.

Figure 8:
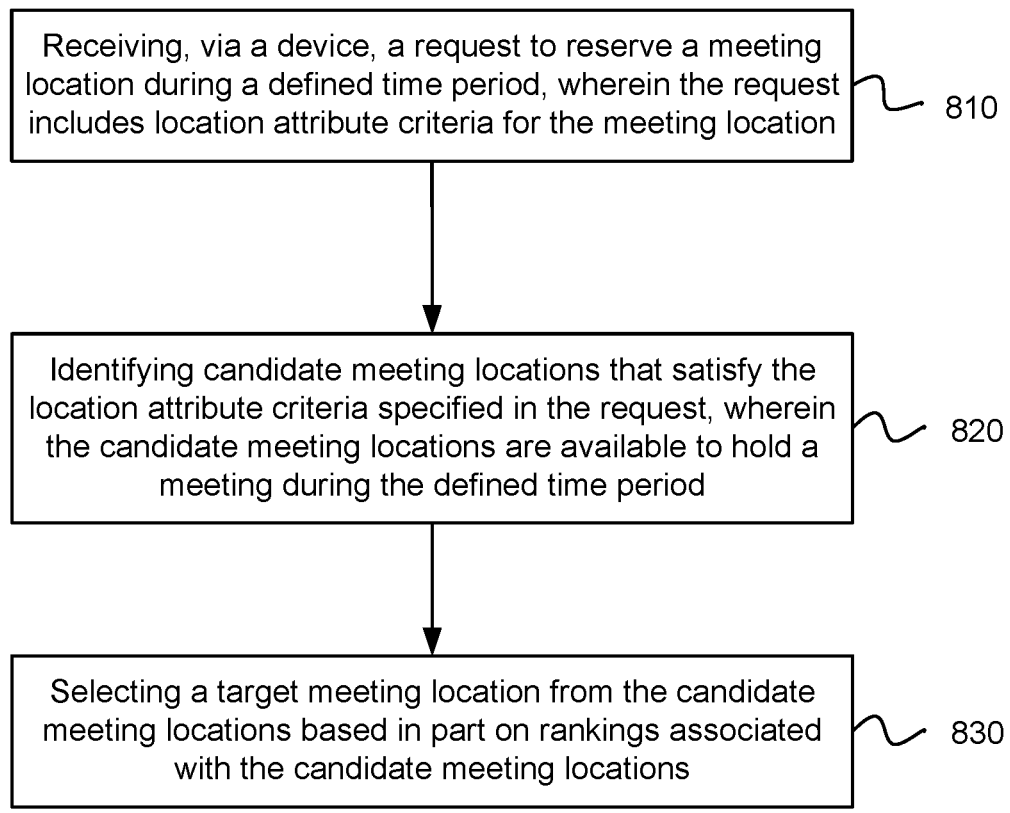
FIG. 8 is a flowchart of another example method for selecting a target meeting location.

FIG. 8 illustrates an example of a method for selecting a target meeting location. A request to reserve a meeting location during a defined time period may be received, as in block 810. The meeting location may be a meeting room, a common space on a particular floor of a building such as a hallway or kitchen, a bench outside an elevator, an entryway of a building, an atrium, a laboratory, a parking lot of a building, etc. The request may be received via a device, an application executing on a computing device, or via a touch panel that is located in the meeting location or outside the meeting location. The request may include location attribute criteria for the meeting location. For example, the location attribute criteria may specify a capacity for the meeting location, a building floor to be associated with the meeting location and/or amenities to be included in the meeting location.

Candidate meeting locations that satisfy the location attribute criteria specified in the request may be identified, as in block 820. For example, the candidate meeting locations may correspond to the location attribute criteria or the location attributes specified in the location attribute criteria. The candidate meeting locations may be available to hold a meeting during the defined time period.

In one example, the candidate meeting locations may be identified based on weightings assigned to location attributes associated with a plurality of meeting locations and these weightings may be applied on a per user or per customer account basis. Certain location attributes may be assigned increased weightings or decreased weightings as predetermined by a user or administrator, where the location attributes may include a capacity of the meeting location, a building floor associated with the meeting location and/or amenities included in the meeting location.

A target meeting location may be selected from the candidate meeting locations based in part on rankings associated with the individual candidate meeting locations, as in block 830. For example, a plurality of meeting locations may be ranked based on a similarity between location attributes of individual meeting locations and the location attributes of the meeting location where the device is located. Individual meeting locations that are assigned a ranking above a defined threshold may be identified as the candidate meeting locations, and a ranking associated with the selected target meeting location may be higher than rankings of other candidate meeting locations. In some cases, in addition to the rankings, the target meeting location may be selected using a round-robin scheduling mechanism or a token-based scheduling mechanism.

In one example, an audio notification may be transmitted to the device for playback that indicates the target meeting location selected to hold the meeting during the defined time period. In another example, a notification may be transmitted to a user computing device that indicates the target meeting location to hold the meeting during the defined time period.

Figure 9:
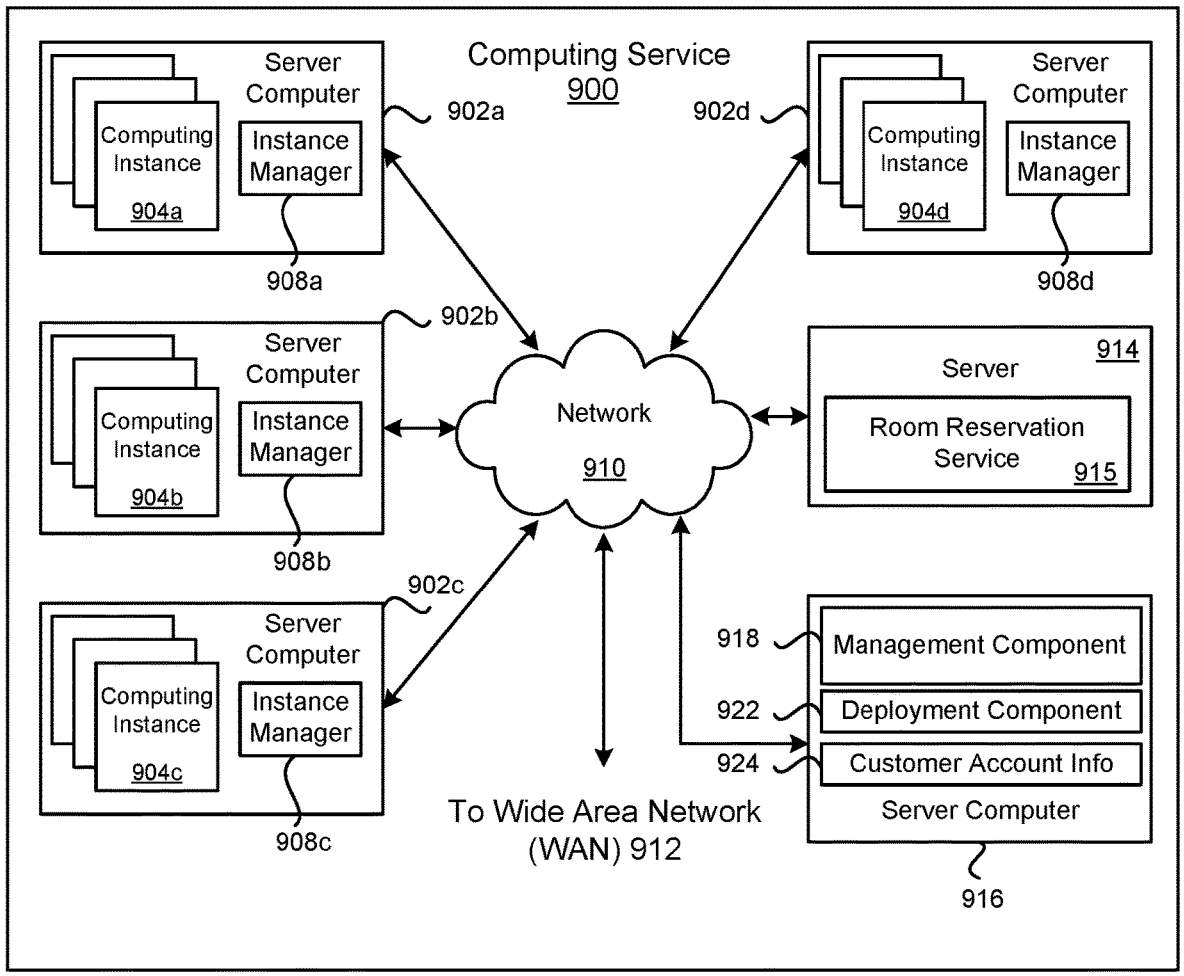
FIG. 9 is a block diagram of a service provider environment according to an example of the present technology.

FIG. 9 is a block diagram illustrating an example computing service 900 that may be used to execute and manage a number of computing instances 904a-d upon which the present technology may execute. In particular, the computing service 900 depicted illustrates one environment in which the technology described herein may be used. The computing service 900 may be one type of environment that includes various virtualized service resources that may be used, for instance, to host computing instances 904a-d.

The computing service 900 may be capable of delivery of computing, storage and networking capacity as a software service to a community of end recipients. In one example, the computing service 900 may be established for an organization by or on behalf of the organization. That is, the computing service 900 may offer a "private cloud environment." In another example, the computing service 900 may support a multi-tenant environment, wherein a plurality of customers may operate independently (i.e., a public cloud environment). Generally speaking, the computing service 900 may provide the following models: Infrastructure as a Service ("IaaS") and/or Software as a Service ("SaaS"). Other models may be provided. For the IaaS model, the computing service 900 may offer computers as physical or virtual machines and other resources. The virtual machines may be run as guests by a hypervisor, as described further below. The PaaS model delivers a computing system that may include an operating system, programming language execution environment, database, and web server.

Application developers may develop and run their software solutions on the computing service system without incurring the cost of buying and managing the underlying hardware and software. The SaaS model allows installation and operation of application software in the computing service 900. End customers may access the computing service 900 using networked client devices, such as desktop computers, laptops, tablets, smartphones, etc. running web browsers or other lightweight client applications, for example. Those familiar with the art will recognize that the computing service 900 may be described as a "cloud" environment.

The particularly illustrated computing service 900 may include a plurality of server computers 902a-d. The server computers 902a-d may also be known as physical hosts. While four server computers are shown, any number may be used, and large data centers may include thousands of server computers. The computing service 900 may provide computing resources for executing computing instances 904a-d.

Computing instances 904a-d may, for example, be virtual machines. A virtual machine may be an instance of a software implementation of a machine (i.e. a computer) that executes applications like a physical machine. In the example of a virtual machine, each of the server computers 902a-d may be configured to execute an instance manager 908a-d capable of executing the instances. The instance manager 908a-d may be a hypervisor, virtual machine manager (VMM), or another type of program configured to enable the execution of multiple computing instances 904a-d on a single server. Additionally, each of the computing instances 904a-d may be configured to execute one or more applications.

A server 914 may be reserved to execute software components for implementing the present technology or managing the operation of the computing service 900 and the computing instances 904a-d. For example, the server 914 may include a room reservation service 915. The room reservation service 915 may receive, via a device in a meeting room, a request to reserve the meeting room during a defined time period. The room reservation service 915 may determine that the meeting room in which the request was received via the device does not have availability to hold a meeting during the defined time period. The room reservation service 915 may identify room attributes of the meeting room. The room reservation service 915 may identify candidate meeting rooms that have room attributes corresponding to the meeting room. The room reservation service 915 may select a target meeting room from the candidate meeting rooms.

A server computer 916 may execute a management component 918. A customer may access the management component 918 to configure various aspects of the operation of the computing instances 904a-d purchased by a customer. For example, the customer may setup computing instances 904a-d and make changes to the configuration of the computing instances 904a-d.

A deployment component 922 may be used to assist customers in the deployment of computing instances 904a-d. The deployment component 922 may have access to account information associated with the computing instances 904a-d, such as the name of an owner of the account, credit card information, country of the owner, etc. The deployment component 922 may receive a configuration from a customer that includes data describing how computing instances 904a-d may be configured. For example, the configuration may include an operating system, provide one or more applications to be installed in computing instances 904a-d, provide scripts and/or other types of code to be executed for configuring computing instances 904a-d, provide cache logic specifying how an application cache is to be prepared, and other types of information. The deployment component 922 may utilize the customer-provided configuration and cache logic to configure, prime, and launch computing instances 904a-d. The configuration, cache logic, and other information may be specified by a customer accessing the management component 918 or by providing this information directly to the deployment component 922.

Customer account information 924 may include any desired information associated with a customer of the multi-tenant environment. For example, the customer account information may include a unique identifier for a customer, a customer address, billing information, licensing information, customization parameters for launching instances, scheduling information, etc. As described above, the customer account information 924 may also include security information used in encryption of asynchronous responses to API requests. By "asynchronous" it is meant that the API response may be made at any time after the initial request and with a different network connection.

A network 910 may be utilized to interconnect the computing service 900 and the server computers 902a-d, 916. The network 910 may be a local area network (LAN) and may be connected to a Wide Area Network (WAN) 912 or the Internet, so that end customers may access the computing service 900. In addition, the network 910 may include a virtual network overlaid on the physical network to provide communications between the servers 902a-d. The network topology illustrated in FIG. 9 has been simplified, as many more networks and networking devices may be utilized to interconnect the various computing systems disclosed herein.

Figure 10:
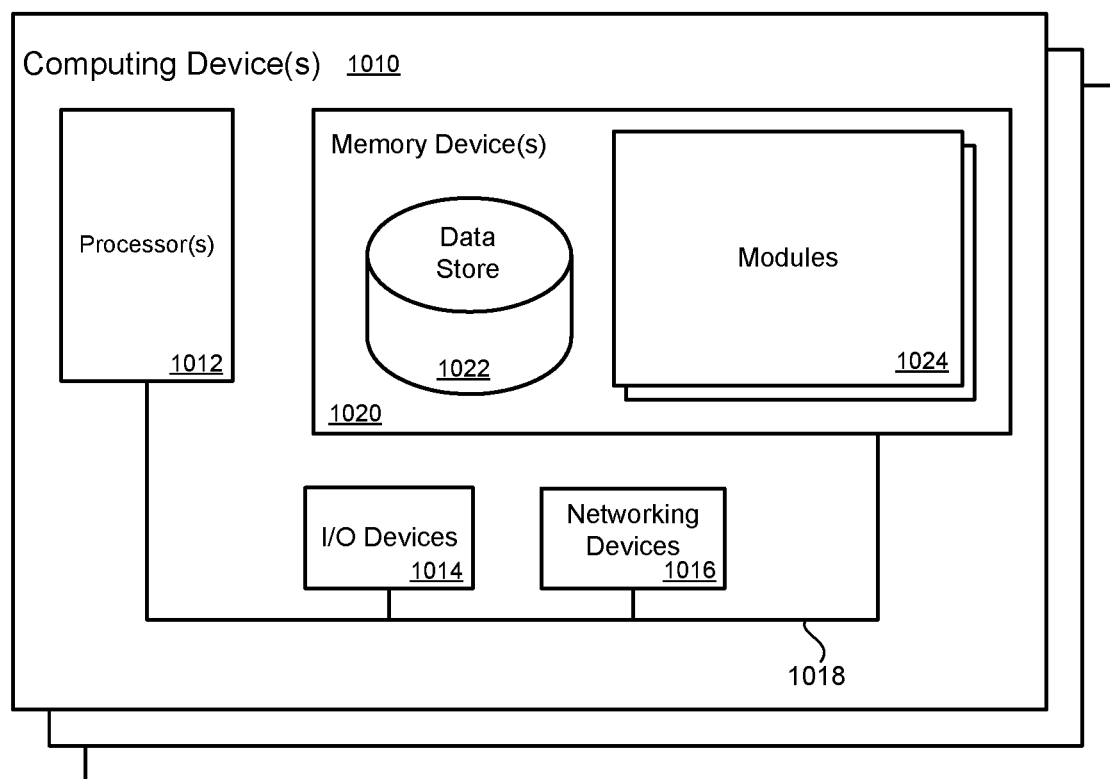
FIG. 10 is a block diagram that provides an example illustration of a computing device that may be employed in the present technology.

FIG. 10 illustrates a computing device 1010 on which modules of this technology may execute. The computing device 1010 is illustrated on which a high level example of the technology may be executed. The computing device 1010 may include one or more processors 1012 that are in communication with memory devices 1020. The computing device may include a local communication interface 1018 for the components in the computing device. For example, the local communication interface may be a local data bus and/or any related address or control busses as may be desired.

The memory device 1020 may contain modules 1024 that are executable by the processor(s) 1012 and data for the modules 1024. The modules 1024 may execute the functions described earlier. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high programming level languages that are compiled, interpreted or executed using a hybrid of the methods.

The computing device may also have access to I/O (input/output) devices 1014 that are usable by the computing devices. An example of an I/O device is a display screen that is available to display output from the computing devices. Other known I/O device may be used with the computing device as desired. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A non-transitory machine readable storage medium having instructions embodied thereon, the instructions when executed by one or more processors, cause the one or more processors to perform a process, comprising:
    receiving, via a device associated with a selected meeting location, a request to reserve the selected meeting location during a defined time period;
    determining that the selected meeting location is not available to hold a meeting during the defined time period;
    identifying location attributes of the selected meeting location, the location attributes include at least a capacity of the selected meeting location, a building floor associated with the selected meeting location and an amenity included in the selected meeting location;
    identifying candidate meeting locations that correspond to the location attributes of the selected meeting location based at least in part on weightings assigned to location attributes associated with a plurality of meeting locations, wherein the location attributes associated with the plurality of meeting locations are assigned increased weightings or decreased weightings as predetermined by a user or administrator, and wherein the location attributes associated with the plurality of meeting locations include at least one of the capacity of the selected meeting location, the building floor associated with the selected meeting location, or the amenity included in selected the meeting location;
    selecting a target meeting location from the candidate meeting locations based in part on rankings associated with the candidate meeting locations; and
    sending a confirmation notification to the device that indicates the target meeting location selected to hold the meeting during the defined time period.

2. The non-transitory machine readable storage medium of claim 1, further comprising: sending an audio notification to the device for playback that indicates the target meeting location selected to hold the meeting during the defined time period.

3. The non-transitory machine readable storage medium of claim 1, further comprising:
    sending a notification to a user computing device that indicates the target meeting location to hold the meeting during the defined time period.

4. The non-transitory machine readable storage medium of claim 1, further comprising:
    ranking a plurality of meeting locations based on a similarity between location attributes of individual meeting locations and the location attributes of the selected meeting location, wherein individual meeting locations that are assigned a ranking above a defined threshold are identified as the candidate meeting locations, and wherein a ranking associated with the selected target meeting location is higher than rankings of other candidate meeting locations.

5. A method, comprising:
    receiving, via a device, a request to reserve a meeting location during a defined time period, wherein the request includes location attribute criteria for the meeting location, the location attribute criteria including at least a capacity of the meeting location, a building floor associated with the meeting location and an amenity included in the meeting location;
    identifying candidate meeting locations that satisfy the location attribute criteria specified in the request based at least in part on weightings assigned to location attributes associated with a plurality of meeting locations, wherein the location attributes associated with the plurality of meeting locations are assigned increased weightings or decreased weightings as predetermined by a user or administrator, and wherein the location attributes associated with the plurality of meeting locations include at least one of the capacity of the meeting location, the building floor associated with the meeting location, or the amenity included in the meeting location;
    selecting a target meeting location from the candidate meeting locations based in part on rankings associated with the candidate meeting locations; and
    sending a confirmation notification to the device that indicates the target meeting location selected to hold the meeting during the defined time period.

6. The method of claim 5, wherein the confirmation notification comprises a first notification, the method further comprising: sending a second notification to a user computing device that indicates the target meeting location selected to hold the meeting during the defined time period.

7. The method of claim 5, further comprising:
ranking a plurality of meeting locations based on a similarity between location attributes of individual meeting locations and the location attribute criteria included in the request, wherein individual meeting locations that are assigned a ranking above a defined threshold are identified as the candidate meeting locations, and wherein a ranking associated with the selected target meeting location is higher than rankings of other candidate meeting locations.

8. The method of claim 5, further comprising: selecting the target meeting location from the candidate meeting locations that satisfy the location attribute criteria using a round-robin scheduling mechanism or a token-based scheduling mechanism.

9. The method of claim 5, further comprising:
receiving user feedback regarding the target meeting location selected to hold the meeting during the defined time period, wherein the user feedback includes a negative user response; and
proposing the meeting in a second meeting location based on the user feedback.

10. A system, comprising:
at least one processor;
at least one memory device including a data store to store a plurality of data and instructions that, when executed, cause the system to:
receive, via a device associated with a selected meeting room, a request to reserve the selected meeting room during a first defined time period associated with a first meeting;
identify room attributes of the selected meeting room, the room attributes including at least a capacity of the selected meeting room, a building floor associated with the selected meeting room and an amenity included in the selected meeting room;
identify candidate meeting rooms that have room attributes corresponding to the selected meeting room based at least in part on weightings assigned to location attributes associated with a plurality of meeting locations, wherein the location attributes associated with the plurality of meeting locations are assigned increased weightings or decreased weightings as predetermined by a user or administrator, and wherein the location attributes associated with the plurality of meeting locations include at least one of the capacity of the selected meeting location, the building floor associated with the selected meeting location, or the amenity included in the selected meeting location;
select a target meeting room from the candidate meeting rooms based in part on rankings associated with the candidate meeting rooms;
determining a second defined time period associated with a second meeting located in the target meeting location scheduled for sequentially prior to the first defined time period; and
selecting the target meeting location based at least in part on the second defined time period being sequentially prior to the first defined time period such that the second meeting and first meeting are adjacent.

11. The system of claim 10, wherein the plurality of data and instructions, when executed, cause the system to: send a notification to the device for playback that indicates the target meeting room selected to hold the meeting during the first defined time period.

12. The system of claim 10, wherein the plurality of data and instructions, when executed, cause the system to: rank a plurality of meeting rooms based on a similarity between room attributes of individual meeting rooms and room attribute criteria included in the request, wherein individual meeting rooms that are assigned a ranking above a defined threshold are identified as the candidate meeting rooms, and wherein a ranking associated with the selected target meeting room is higher than rankings of other candidate meeting rooms.

13. The non-transitory machine readable storage medium of claim 1, further comprising receiving user feedback indicating that the target meeting location is not suitable.

14. The non-transitory machine readable storage medium of claim 1, wherein the defined time period comprises a first defined time period associated with a first meeting, the process further comprising:
determining a second defined time period associated with a second meeting located in the target meeting location scheduled for sequentially prior to the first defined time period; and
selecting the target meeting location based at least in part on the second defined time period being sequentially prior to the first defined time period such that the second meeting and first meeting are back-to-back.

15. The non-transitory machine readable storage medium of claim 14, further comprising scheduling a time buffer between the second meeting and the first meeting.

16. The non-transitory machine readable storage medium of claim 1, wherein the request to receive the selected meeting location is received via a calendar application.

17. The method of claim 5, further comprising sending an email notification to the device that indicates the target meeting location selected to hold the meeting during the defined time period.

18. The method of claim 5, further comprising receiving user feedback indicating that the target meeting location is not suitable.

19. The non-transitory machine readable storage medium of claim 1, wherein the device is located at the meeting location.

20. The non-transitory machine readable storage medium of claim 1, wherein the device comprises a voice-capturing device and the request comprises a voice command.

* * * * *